United States Patent
Uchida

(10) Patent No.: US 9,395,714 B2
(45) Date of Patent: Jul. 19, 2016

(54) SYSTEM CONSTRUCTION SUPPORT TOOL AND SYSTEM

(71) Applicant: Ryo Uchida, Tokyo (JP)

(72) Inventor: Ryo Uchida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/420,438

(22) PCT Filed: Oct. 25, 2012

(86) PCT No.: PCT/JP2012/077657
§ 371 (c)(1),
(2) Date: Feb. 9, 2015

(87) PCT Pub. No.: WO2014/064819
PCT Pub. Date: May 1, 2014

(65) Prior Publication Data
US 2015/0220076 A1    Aug. 6, 2015

(51) Int. Cl.
*G06F 19/00*    (2011.01)
*G05B 19/05*    (2006.01)
*G05B 19/042*    (2006.01)

(52) U.S. Cl.
CPC ............. *G05B 19/05* (2013.01); *G05B 19/042* (2013.01); *G05B 2219/24215* (2013.01)

(58) Field of Classification Search
CPC ................ G05B 19/05; G05B 19/042; G05B 2219/24215
USPC .......................................................... 700/97
See application file for complete search history.

(56) References Cited

U.S. PATENT DOCUMENTS

| | | | | |
|---|---|---|---|---|
| 5,812,394 A | * | 9/1998 | Lewis ................ | G05B 19/0426 700/17 |
| 6,510,352 B1 | * | 1/2003 | Badavas ............. | G05B 19/0426 700/18 |
| 6,643,555 B1 | * | 11/2003 | Eller .................. | G05B 19/0426 700/17 |
| 6,754,885 B1 | * | 6/2004 | Dardinski ............. | G05B 15/02 717/113 |
| 6,799,080 B1 | | 9/2004 | Hylden et al. | |
| 7,089,530 B1 | * | 8/2006 | Dardinski ............. | G05B 15/02 700/83 |
| 7,096,465 B1 | * | 8/2006 | Dardinski .......... | G05B 19/0426 717/121 |
| 7,647,126 B2 | | 1/2010 | Blevins et al. | |
| 7,680,546 B2 | | 3/2010 | Gilbert et al. | |

(Continued)

FOREIGN PATENT DOCUMENTS

DE    102004051179 A1    6/2005
JP    10-207531 A    8/1998

(Continued)

OTHER PUBLICATIONS

Patel, M., et al. "Development of a novel SCADA system for laboratory testing." ISA transactions 43.3 (2004): 477-490.*

(Continued)

*Primary Examiner* — Michael D Masinick
(74) *Attorney, Agent, or Firm* — Sughrue Mion, PLLC; Richard C. Turner

(57) ABSTRACT

In a system construction support tool, an allocating unit allocates one piece of template information selected from among a plurality of template information to each of a plurality of apparatuses to perform, concerning each of the apparatuses, tying by tag names among monitoring screen setting data, PLC project setting data, and tag server setting data.

13 Claims, 8 Drawing Sheets

(56) References Cited

U.S. PATENT DOCUMENTS

| | | | |
|---|---|---|---|
| 7,702,409 B2 | 4/2010 | Lucas et al. | |
| 7,783,370 B2 | 8/2010 | Nixon et al. | |
| 7,890,927 B2 * | 2/2011 | Eldridge | G05B 15/02 700/86 |
| 7,971,151 B2 | 6/2011 | Nixon et al. | |
| 7,984,096 B2 | 7/2011 | Beoughter et al. | |
| 8,000,814 B2 * | 8/2011 | Havekost | G05B 19/0426 340/3.1 |
| 8,060,834 B2 | 11/2011 | Lucas et al. | |
| 8,086,955 B2 | 12/2011 | Zhou et al. | |
| 8,127,241 B2 | 2/2012 | Blevins et al. | |
| 8,135,481 B2 * | 3/2012 | Blevins | G05B 17/02 700/30 |
| 8,144,150 B2 | 3/2012 | Gilbert et al. | |
| 8,185,219 B2 | 5/2012 | Gilbert et al. | |
| 8,185,892 B2 | 5/2012 | Lucas et al. | |
| 8,312,060 B2 | 11/2012 | Gilbert et al. | |
| 8,775,967 B2 | 7/2014 | Nixon et al. | |
| 2003/0105535 A1 * | 6/2003 | Rammler | G05B 19/409 700/17 |
| 2005/0144271 A1 | 6/2005 | Shirane et al. | |
| 2007/0168060 A1 | 7/2007 | Nixon et al. | |
| 2008/0133030 A1 * | 6/2008 | Torigoe | G05B 23/0213 700/2 |
| 2008/0244559 A1 * | 10/2008 | Imasato | G06F 8/30 717/174 |
| 2011/0040390 A1 | 2/2011 | Blevins et al. | |

FOREIGN PATENT DOCUMENTS

| | | |
|---|---|---|
| JP | 11-338903 A | 12/1999 |
| JP | 2003-273875 A | 9/2003 |
| JP | 2005-259079 A | 9/2005 |
| JP | 2005-327237 A | 11/2005 |
| JP | 2007-504570 A | 3/2007 |
| JP | 2007-536632 A | 12/2007 |
| JP | 2007-536648 A | 12/2007 |
| JP | 2008-97424 A | 4/2008 |
| JP | 2008-191900 A | 8/2008 |
| JP | 2009-116429 A | 5/2009 |
| JP | 2011-40059 A | 2/2011 |
| WO | 2005/109128 A1 | 11/2005 |

OTHER PUBLICATIONS

Anh, Phan Duy, and Truong Dinh Chau. "Component-based design for SCADA architecture." International Journal of Control, Automation and Systems 8.5 (2010): 1141-1147.*

Japanese Office Action for JP 2013-500263 dated Feb. 19, 2013.

International Search Report for PCT/JP2012/077657 dated Nov. 20, 2012.

Communication dated Dec. 23, 2015 from the German Patent Office issued in corresponding Application No. 112012006925.0.

* cited by examiner

SYSTEM CONSTRUCTION SUPPORT TOOL AND SYSTEM

CROSS REFERENCE TO RELATED APPLICATIONS

This application is a National Stage of International Application No. PCT/JP2012/077657 filed Oct. 25, 2012, the contents of which are incorporated herein by reference in their entirety.

FIELD

The present invention relates to a system construction support tool and a system.

BACKGROUND

In a monitoring and control system in which a monitoring apparatus monitors and controls a plurality of apparatuses via a tag server and a PLC (Programmable Logic Controller), a face plate screen for operation of each of the apparatuses is displayed on the monitoring apparatus (SCADA: Supervisory Control and Data Acquisition System). A control program of the apparatus for returning an operation state of the apparatus to the face plate screen and sending an operation instruction from the face plate screen to the apparatus is executed in the PLC. Further, a control program for combining several apparatuses to realize a desired system operation (interlock, group start and stop, automatic operation, etc.) is executed in the PLC. On the monitoring apparatus (the SCADA), a monitoring screen (an overview screen), on which screen components (symbols) representing apparatuses are arranged on a general view that simulates a process of a plant, is present. A face plate screen of an apparatus corresponding to a symbol on the overview screen can be popup-displayed from the symbol. A tag server (a communication function) that performs communication for reading and writing data between the monitoring screen and the control program is prepared. The tag server is a server that performs communication with a physical device such as a PLC and exchanges a data value with any arbitrary application via a tag.

When the monitoring and control system is constructed, creation of an apparatus control program (a PLC program), setting of a communication function (a tag server, etc.), setting of an alarm, a trend, and the like, and drawing of a face plate screen (a monitoring screen) are necessary for each of the apparatuses.

Patent Literature 1 describes a configurable control system that enables setting of a chemical substance processing system. The configurable control system displays a main selection screen. When "room" is selected from an object menu and "add" is selected from an action entry, the configurable control system displays a "room addition screen". When a desired room name is input and "end" is selected, the configurable control system closes the room addition screen. The configurable control system displays the main selection screen again. When a desired chemical substance system is selected from the object menu and "add" is selected from the action entry, the configurable control system displays a screen for addition of a chemical substance system. When a desired chemical substance name and a desired chemical substance room are input and "end" is selected, the configurable control system closes the screen for addition of a chemical substance system. The configurable control system displays the main selection screen again. When a field IO panel is selected from the object menu and "add" is selected from the action entry, the configurable control system displays a screen for addition of a field IO panel. When an FIOP name is input, "LAN" is selected, "node" is selected, and "end" is selected, then the configurable control system closes the screen for addition of a field IO panel. Consequently, according to Patent Literature 1, because initial setting of a process is performed according to a menu on a screen image, it is possible to perform the initial setting of the process without correcting a software program.

Patent Literature 2 mentions that, in a data server of a network system in which a network between the data server and a PLC is duplicated by a first control network and a second control network, when tag information for associating a logical tag name and an identification ID of a real device (an IO memory of the PLC) is input to a tag-information input unit, tag information of a predetermined format is generated from the input tag information by a tag-information setting unit and registered in a tag-information storing unit. The data server determines connection abnormality of the network on the basis of a data readout request designated by a logical tag name from a data client and, when there is abnormality, switches the network from the present network to a backup network. The data server acquires a physical address of the IO memory of the PLC corresponding to the logical tag name, accesses the physical address of the IO memory of the PLC, and reads out data. The data server returns a completion notification of the readout and the read-out data to the data client. Consequently, according to Patent Literature 2, switching during network abnormality is performed on the data server side and the data client only has to designate the logical tag name. Therefore, development can be easily performed.

Patent Literature 3 mentions that, in a monitoring apparatus that manages a control state of a plant in control function units called tags, a search for a tag name is performed with respect to created graphic screen data to generate tag list information and a graphic screen related to a tag set to an alarm when abnormality occurred in a process value (a tag) of the plant is displayed. Consequently, according to Patent Literature 3, concerning registration of a number of a graphic screen related to a tag, a manual input is made unnecessary and a registration mistake does not occur.

Patent Literature 4 describes a system for configuring a process plant. Patent Literature 4 mentions that, in the system, when a process block is dragged and dropped, an interactive process graphics editor adds a process module corresponding to the process block to the process plant. Consequently, according to Patent Literature 4, it is possible to easily configure the process plant.

Patent Literature 5 describes a display editor for configuring a process plant. The display editor is executed by a user and generates a graphic element serving as an element of the process plant. In this case, visualization of the graphic element is dragged and dropped to a main editing section of the display editor to be arranged in the main editing section of the display editor. The generated graphic element is bound with specific hardware. Consequently, according to Patent Literature 5, the graphic element is connected to the process plant logically and by communication.

CITATION LIST

Patent Literature

Patent Literature 1: Japanese Translation of International Patent Application No. 2007-504570

Patent Literature 2: Japanese Patent Application Laid-Open No. 2003-273875
Patent Literature 3: Japanese Patent Application Laid-Open No. H10-207531
Patent Literature 4: Japanese Translation of International Patent Application No. 2007-536632
Patent Literature 5: Japanese Translation of International Patent Application No. 2007-536648

SUMMARY

Technical Problem

When the monitoring and control system is constructed, it is necessary to perform tying of data using tag names during creation of a plurality of setting items (e.g., an apparatus control program (a PLC program)), setting of a communication function (a tag server, etc.), setting of an alarm, a trend, and the like, and a face plate screen (a monitoring screen).

The technologies described in Patent Literatures 1, 2, 4, and 5 are based on the premise that, when a system is constructed, a plurality of setting items of the system are interactively selected one by one. That is, in the technologies described in Patent Literatures 1, 2, 4, and 5, when the technologies are used for construction of a monitoring and control system including a large number of setting items (a large number of functions and a large number of screens), it is necessary to select the large number of setting items one by one. Therefore, it is likely that the number of processes for the construction of the monitoring and control system increases and work for the construction of the monitoring and control system is made complicated. Further, in the technologies described in Patent Literatures 1, 2, 4, and 5, although there is no explicit description, when tying of data is performed among the large number of setting items, the large number of setting items are considered to be also interactively selected one by one. It is likely that the number of processes for the construction of the monitoring and control system further increases and the work of the construction of the monitoring and control system is made further complicated.

Patent Literature 3 does not describe at all how the system is constructed, does not describe at all either concerning how the data of the setting items are tied, and does not described at all either how the number of processes for the construction of the monitoring and control system is reduced.

The present invention has been devised in view of the above and it is an object of the present invention to obtain a system construction support tool and a system that can reduce the number of processes of construction of a monitoring and control system.

Solution to Problem

In order to solve the aforementioned problems, a system construction support tool according to the present invention that supports construction of a monitoring and control system in which a monitoring apparatus monitors and controls a plurality of apparatuses via a tag server and a PLC (Programmable Logic Controller) is constructed in such a manner as to include: an input unit to which an apparatus list in which, concerning the plurality of apparatuses, attributes of apparatuses including apparatus types are specified is input; a storing unit that stores a plurality of template information in which an apparatus type name and a plurality of setting data are respectively associated; and an allocating unit that specifies an apparatus type concerning each of the plurality of apparatuses according to the input apparatus list and allocates one piece of template information selected from among the plurality of template information to each of the apparatuses according to the specified apparatus type, wherein in each of the plurality of template information, the setting data are tied to one another using tag names in advance; the setting data include monitoring screen setting data, PLC project setting data, and tag server setting data, and the allocating unit allocates one piece of template information selected from among the plurality of template information to each of the apparatuses to perform, concerning each of the apparatuses, tying by tag names among the monitoring screen setting data, the PLC project setting data, and the tag server setting data Advantageous Effects of Invention According to the present invention, by allocating one piece of template information selected from among a plurality of template information to each of the apparatuses, the tying by the tag names among the monitoring screen setting data, the PLC project setting data, and the tag server setting data is performed for each of the apparatuses. Therefore, it is made unnecessary to perform a large number of repeated setting works concerning the tying by the tag names among the setting data. As a result, it is made possible to reduce the number of processes for the construction of the monitoring and control system.

DESCRIPTION OF EMBODIMENTS

An embodiment of a system construction support tool according to the present invention is explained in detail below with reference to the drawings. Note that the present invention is not limited by the embodiment.

Embodiment.

Figure 1:
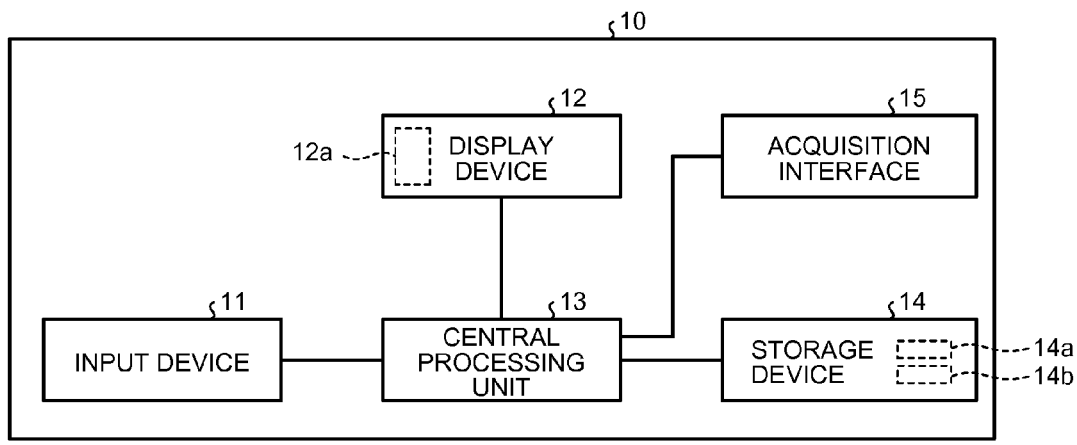
FIG. 1 is a diagram of the hardware configuration concerning a system design support tool according to an embodiment.
Figure 2:
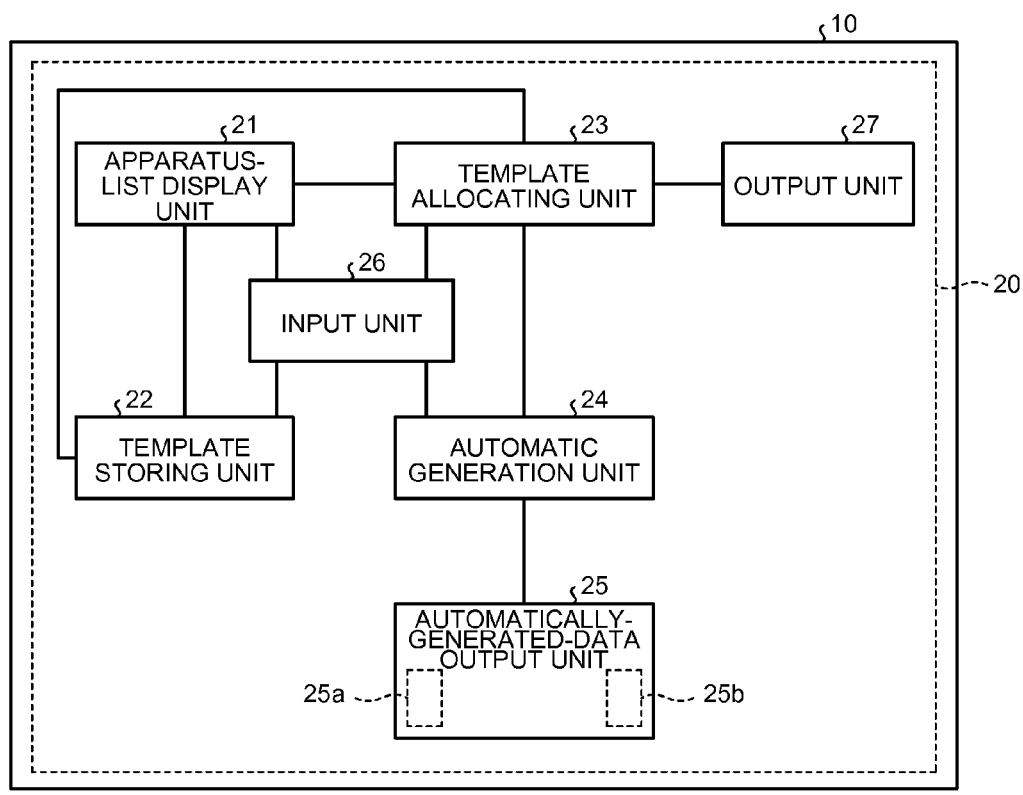
FIG. 2 is a diagram of the functional configuration of the system design support tool according to the embodiment.
Figure 3:
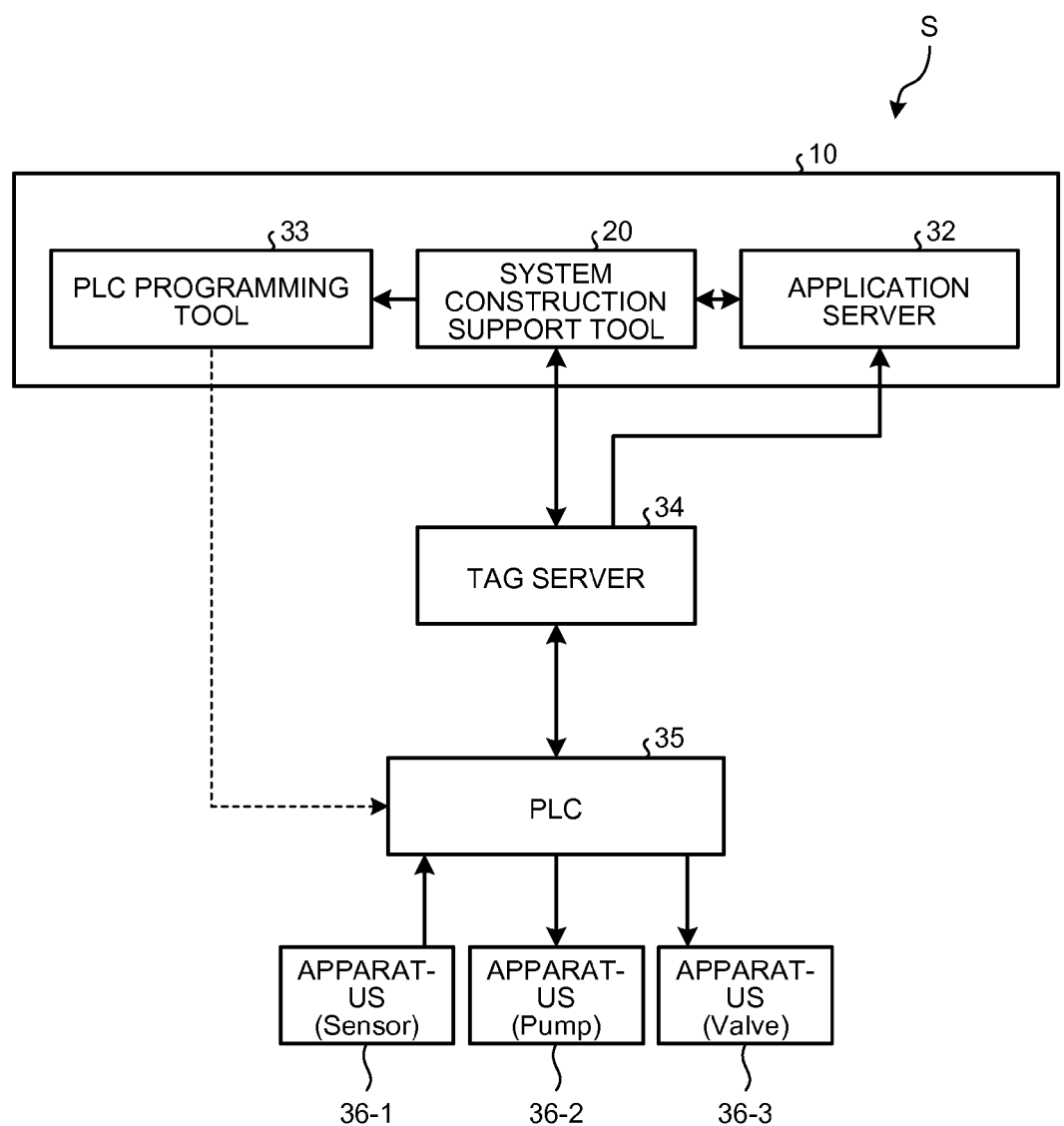
FIG. 3 is a diagram of the configuration of a system constructed by the system design support tool according to the embodiment.
Figure 4:
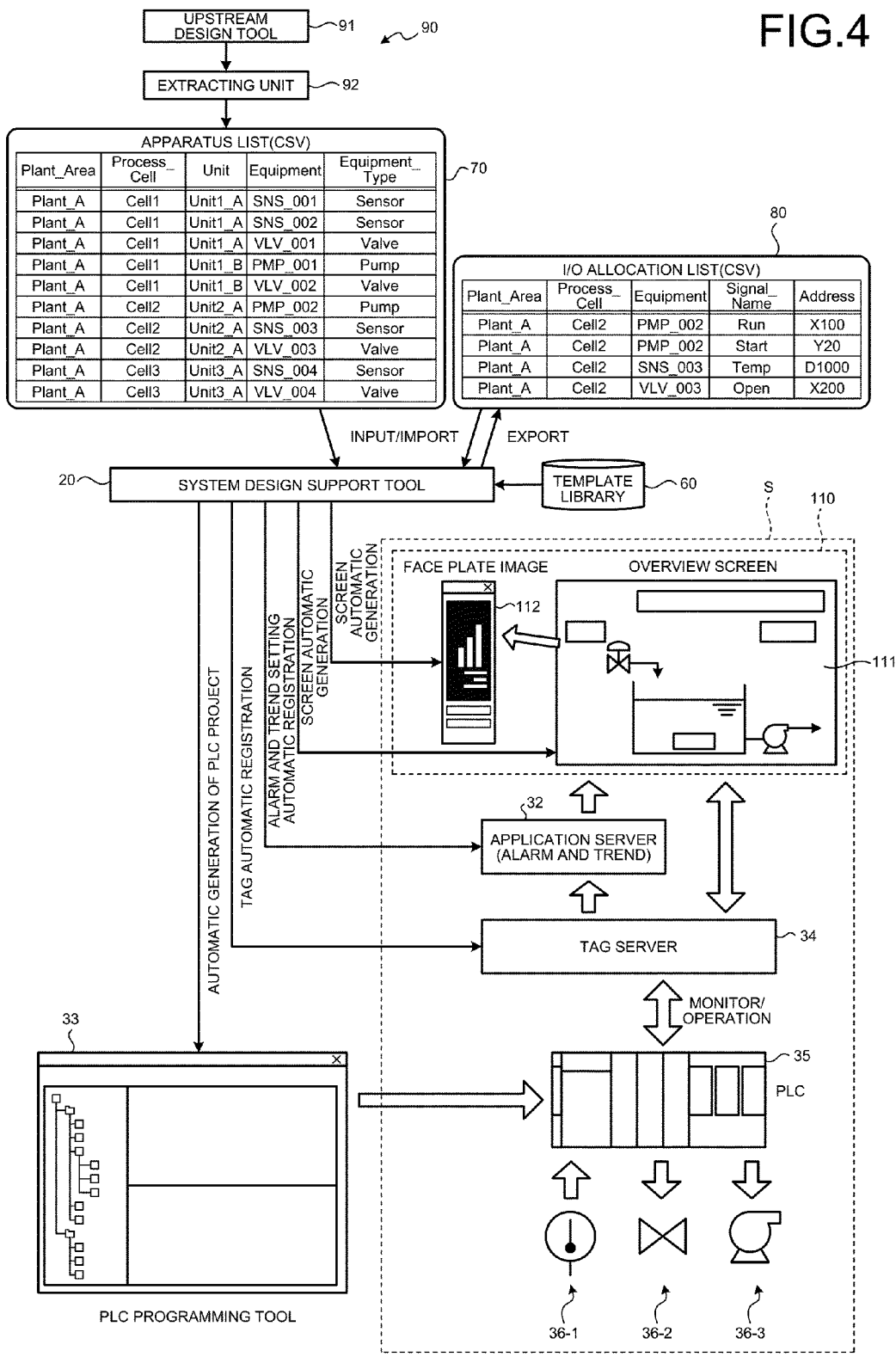
FIG. 4 is a diagram of the operation of the system design support tool according to the embodiment.

A system construction support tool 20 according to an embodiment is explained with reference to FIG. 1 to FIG. 4. FIG. 1 is the hardware configuration of an information processing apparatus 10 in which the system construction support tool 20 is installed and executed. FIG. 2 is a diagram of the functional configuration of the system construction support tool 20 generated in the information processing apparatus 10. FIG. 3 is a diagram of the configuration of a monitoring and control system constructed by the system construction support tool 20. FIG. 4 is a diagram of the operation of the system construction support tool 20.

The system construction support tool 20 generates, for example, various kinds of information necessary in constructing a monitoring and control system S for a factory or various social infrastructure facilities. The monitoring and control system S monitors and controls a plurality of apparatuses in the factory or the various social infrastructure facilities.

For example, as shown in FIG. 3, in the monitoring and control system S, the information processing apparatus 10 functioning as a monitoring apparatus (SCADA: Supervisory Control And Data Acquisition System) monitors and controls a plurality of apparatuses 36-1 to 36-3 via a tag server 34 and a PLC (Programmable Logic Controller) 35. The information processing apparatus 10 includes the system construction support tool 20, an application server 32, and a PLC programming tool 33. The tag server 34 performs communications for reading and writing data of the system construction support tool 20 and the PLC 35. The application server 32 collects data of the PLC 35 from the tag server 34 and stores data of an alarm and data of a trend. The PLC programming tool 33 performs setting, programming, and the like of the PLC 35, and reads the setting of a PLC, a PLC program and the like from and writes the same in the PLC 35.

The apparatuses 36-1 to 36-3 include the apparatuses 36-2 and 36-3 of a type for performing predetermined operations such as a process machine or an assembly machine in a factory and include the apparatus 36-1 of a type for measuring parameters (e.g., temperature) indicating a state of the process machine or the assembly machine in the factory. For example, the monitoring and control system S monitors the apparatuses 36-2 and 36-3 of a type for performing predetermined operations according to values of parameters acquired from the apparatus 36-1 of a measuring type and controls the operations of the apparatuses 36-2 and 36-3 of a type for performing predetermined operations according to monitoring results (e.g., the data of the alarm and/or the data of the trend stored in the application server 32). The system construction support tool 20 supports construction of such a monitoring and control system S.

The system construction support tool 20 is installed in, for example, the information processing apparatus 10 shown in FIG. 1 and is executed in the information processing apparatus 10. The information processing apparatus 10 is, for example, an apparatus that performs information processing for supporting construction of the monitoring and control system S and is, for example, a personal computer. The information processing apparatus 10 includes, as hardware components, for example, an input device 11, a display device 12, a storage device 14, an acquisition interface 15, and a central processing unit 13.

The input device 11 is a device to which an instruction from a user is input and is, for example, a keyboard or a pointing device. Alternatively, the input device 11 is, for example, a section that detects an input on a touch panel. When the input device 11 is the section that detects an input on the touch panel, the input device 11 can be provided in the display device 12. When an instruction from the user is input, the input device 11 supplies the instruction to the central processing unit 13.

The display device (a display unit) 12 is a device that displays information on a display screen 12a and is, for example, a display such as an LCD (Liquid Crystal Display). The display device 12 displays information corresponding to an instruction from the user and displays information corresponding to an instruction from the central processing unit 13 under the control by the central processing unit 13.

The storage device 14 is a device that stores information and includes, for example, a nonvolatile storage device 14a and a volatile storage device 14b. The nonvolatile storage device 14a stores initial setting data such as product specifications and a template library 60 (see FIG. 4 and FIG. 9) and stores data written by the central processing unit 13. The nonvolatile storage device 14a can be a magnetic storage device such as a hard disk or can be a nonvolatile semiconductor memory such as a flash memory. The volatile storage device 14b temporarily stores data written by the central processing unit 13 and is appropriately used as, for example, a work memory during execution of the central processing unit 13. The volatile storage device 14b can be a volatile semiconductor memory such as a dynamic random access memory.

The acquisition interface 15 is an interface for acquiring the system construction support tool 20. For example, when the system construction support tool 20 is acquired from a recording medium such as a CD-ROM, the acquisition interface 15 is an interface for reading the system construction support tool 20 recorded in the recording medium. Alternatively, for example, when the system construction support tool 20 is acquired through a communication line, the acquisition interface 15 is an interface for receiving the system construction support tool 20 transmitted via the communication line.

The central processing unit 13 comprehensively controls the units of the information processing apparatus 10. For example, when receiving an installation instruction for the system construction support tool 20 via the input device 11, the central processing unit 13 acquires, according to the installation instruction, installation data of the system construction support tool 20 via the acquisition interface 15 and installs the system construction support tool 20 in the nonvolatile storage device 14a of the storage device 14 according to the installation data. Alternatively, for example, when receiving a start instruction for the system construction support tool 20 via the input device 11, the central processing unit 13 accesses the nonvolatile storage device 14a, reads out and executes the system construction support tool 20, and expands a predetermined functional module in the volatile storage device 14b and generates the predetermined functional module.

Note that a plurality of functional modules (see FIG. 2), which should be generated in the volatile storage device 14b according to the execution of the system construction support tool 20, can be simultaneously generated, can be sequentially generated according to progress of processing, or can be generated in parallel according to the progress of the processing.

A plurality of functional modules generated (in the volatile storage device 14b) in the information processing apparatus 10 according to the execution of the system construction support tool 20 are explained with reference to FIG. 2. In FIG. 2, the functional modules generated in the information processing apparatus 10 according to the execution of the system construction support tool 20 are shown as "units".

Specifically, the system construction support tool 20 includes an apparatus-list display unit 21, an input unit 26, a template storing unit 22, a template allocating unit 23, an output unit 27, an automatic generation unit 24, and an automatically-generated-data output unit 25.

Figure 7:
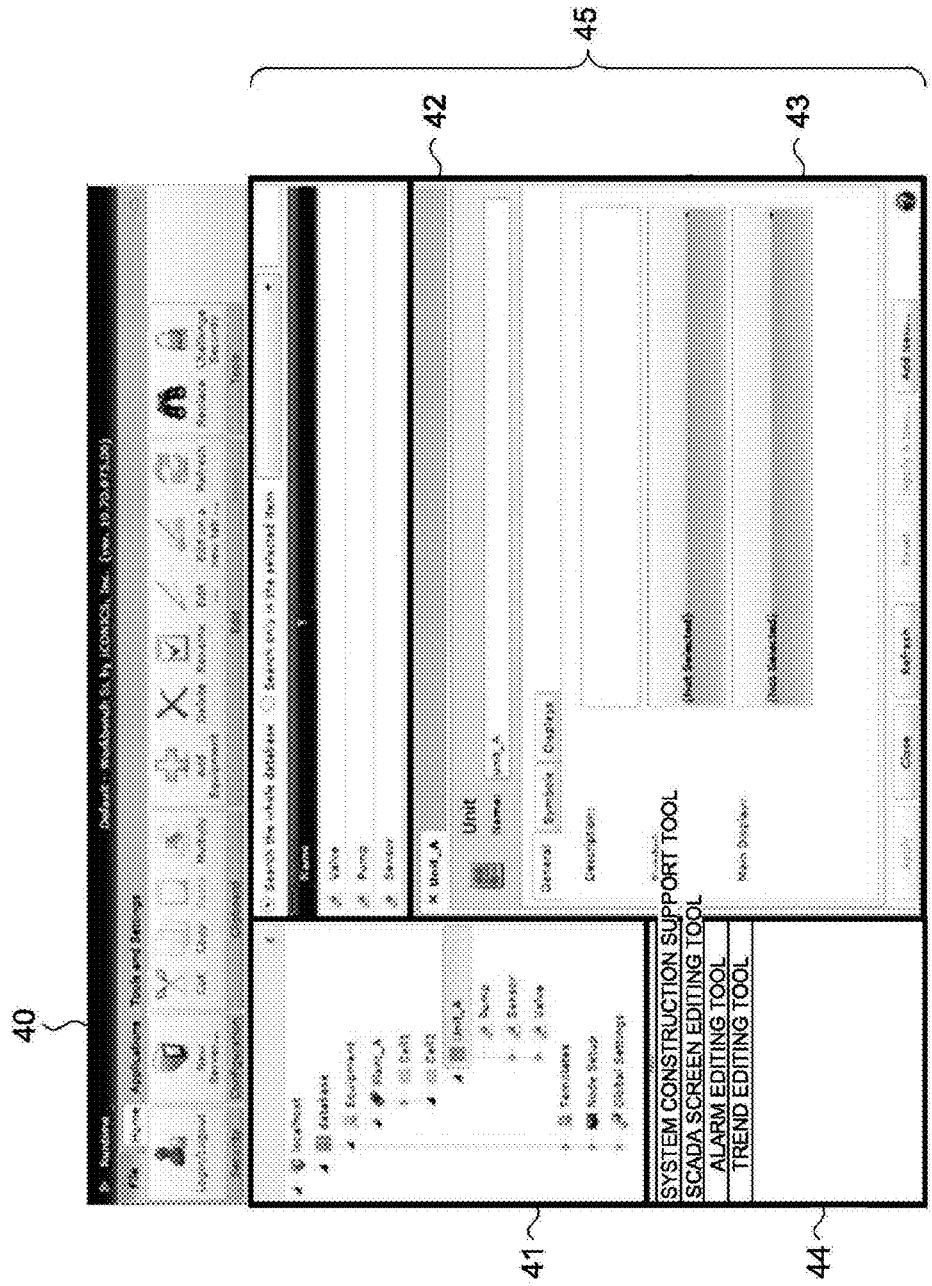
FIG. 7 is a diagram of the configuration of a system design support tool screen in the embodiment.

The apparatus-list display unit 21 displays, for example, according to the start of the system construction support tool 20, a system construction support tool screen 40 (see FIG. 7)

functioning as a setting screen on the display screen 12a of the display device 12. The system construction support tool screen 40 includes, for example, a tree display section 41 on which a plurality of apparatuses set to be monitored and controlled by the monitoring and control system S are displayed. On the tree display section 41, no apparatus is displayed in an initial state before the tree display section 41 is set to include the apparatuses. When the tree display section 41 is set to include the apparatuses, for example, a list of the apparatuses (an apparatus list) is displayed on the tree display section 41.

An apparatus list (see FIG. 4 and FIG. 5) 70 is input to the input unit 26. The apparatus list 70 is a list of information concerning apparatuses extracted from information determined in upstream design such as a piping and instrumentation diagram (P&ID) for a monitoring target. That is, in the apparatus list 70, concerning the apparatuses that should be monitored and controlled by the monitoring and control system S, attributes of apparatuses including apparatus types are specified. In the apparatus list 70, for example, concerning the apparatuses that should be monitored and controlled by the monitoring and control system S, identifiers (e.g., Equipment information 74 shown in FIG. 5) of the apparatuses are associated with information (e.g., Equipment_type information 75 shown in FIG. 5) indicating attributes of the apparatuses.

For example, the apparatus list 70 is input (imported) to the input unit 26 via the input device 11. For example, when an icon indicating a file of the apparatus list 70 is dragged and dropped to the tree display section 41 of the system construction support tool screen 40 of the system construction support tool 20, the apparatus list 70 is input to the input unit 26.

For example, the input unit 26 supplies the input apparatus list 70 to the apparatus-list display unit 21 according to a request from the apparatus-list display unit 21. Consequently, the apparatus-list display unit 21 displays, according to the input apparatus list 70, on the tree display section 41 or the like, for example, a list of the apparatuses monitored and controlled by the monitoring and control system S. The input unit 26 supplies the input apparatus list 70 to the template allocating unit 23.

For example, the template storing unit 22 reads out and stores a plurality of template information TI1 and TI2 from the template library 60 (see FIG. 4 and FIG. 9) stored in the nonvolatile storage device 14a. In the template information TI1 and TI2, an apparatus type name 61 and a plurality of setting data 62 to 67 are associated (see FIG. 9). The setting data 62 to 67 in the template information TI1 and TI2 include design contents that can be made common for each of types of apparatuses. In the template information TI1 and TI2, the setting data 62 to 67 are tied to one another by tag names 62a to 67a in advance (see FIG. 9). That is, the setting data 62 to 67 are associated with one another by the tag names 62a to 67a in advance such that, when a state of one setting data in the setting data 62 to 67 changes, states of the other setting data in the setting data 62 to 67 also change in association with the change.

For example, the template storing unit 22 supplies the stored plurality of template information TI1 and TI2 to the apparatus-list display unit 21 according to a request from the apparatus-list display unit 21. Consequently, the apparatus-list display unit 21 displays the plurality of template information TI1 and TI2 on the tree display section 41 or the like. The template storing unit 22 supplies the plurality of template information TI1 and TI2 to the template allocating unit 23 according to a request from the template allocating unit 23. Alternatively, the template storing unit 22 supplies template information designated from among the plurality of template information TI1 and TI2 to the template allocating unit 23 according to a request from the template allocating unit 23.

Alternatively, for example, when receiving an instruction for additional registration of template information via the input unit 26 and the input device 11, the template storing unit 22 receives the template information from the input unit 26. The template storing unit 22 adds the received template information to the stored plurality of template information TI1 and TI2 and updates, on the basis of the plurality of template information TI1 and TI2 and the added template information, the template library 60 stored in the nonvolatile storage device 14a by overwriting the template library 60.

The template allocating unit 23 allocates the template information to the apparatuses. Specifically, when recognizing the input of the apparatus list 70, for example, according to the reception of the apparatus list 70 from the input unit 26, the template allocating unit 23 specifies an apparatus type concerning each of the apparatuses according to the apparatus list 70.

When recognizing the input of the apparatus list 70, the template allocating unit 23 accesses the template storing unit 22 and acquires the plurality of template information TI1 and TI2. The template allocating unit 23 allocates, to each of the apparatuses, one piece of template information selected from among the plurality of template information TI1 and TI2 according to the specified apparatus type.

In this case, the template allocating unit 23 allocates the one piece of template information selected from among the plurality of template information to each of the apparatuses to perform, concerning each of the apparatuses, tying by tag names among monitoring screen setting data 63, PLC project setting data 64, alarm setting data 65, trend setting data 66, and tag server setting data 67.

Alternatively, when the template allocating unit 23 has grasped the plurality of template information stored in the template storing unit 22 from a plurality of template information acquired in the past, the template allocating unit 23 does not access the template storing unit 22 and allocates, to each of the apparatuses, one piece of template information selected from among the plurality of template information TI1 and TI2. The template allocating unit 23 selectively designates a plurality of template information allocated to the apparatuses from among all the plurality of template information stored in the template storing unit 22 and acquires the designated plurality of template information from the template storing unit 22.

In this case, the template allocating unit 23 allocates, to each of the apparatuses, the one piece of template information selected from among the plurality of template information to perform, concerning each of the apparatuses, tying by tag names among the monitoring screen setting data 63, the PLC project setting data 64, the alarm setting data 65, the trend setting data 66, and the tag server setting data 67.

Figure 9:
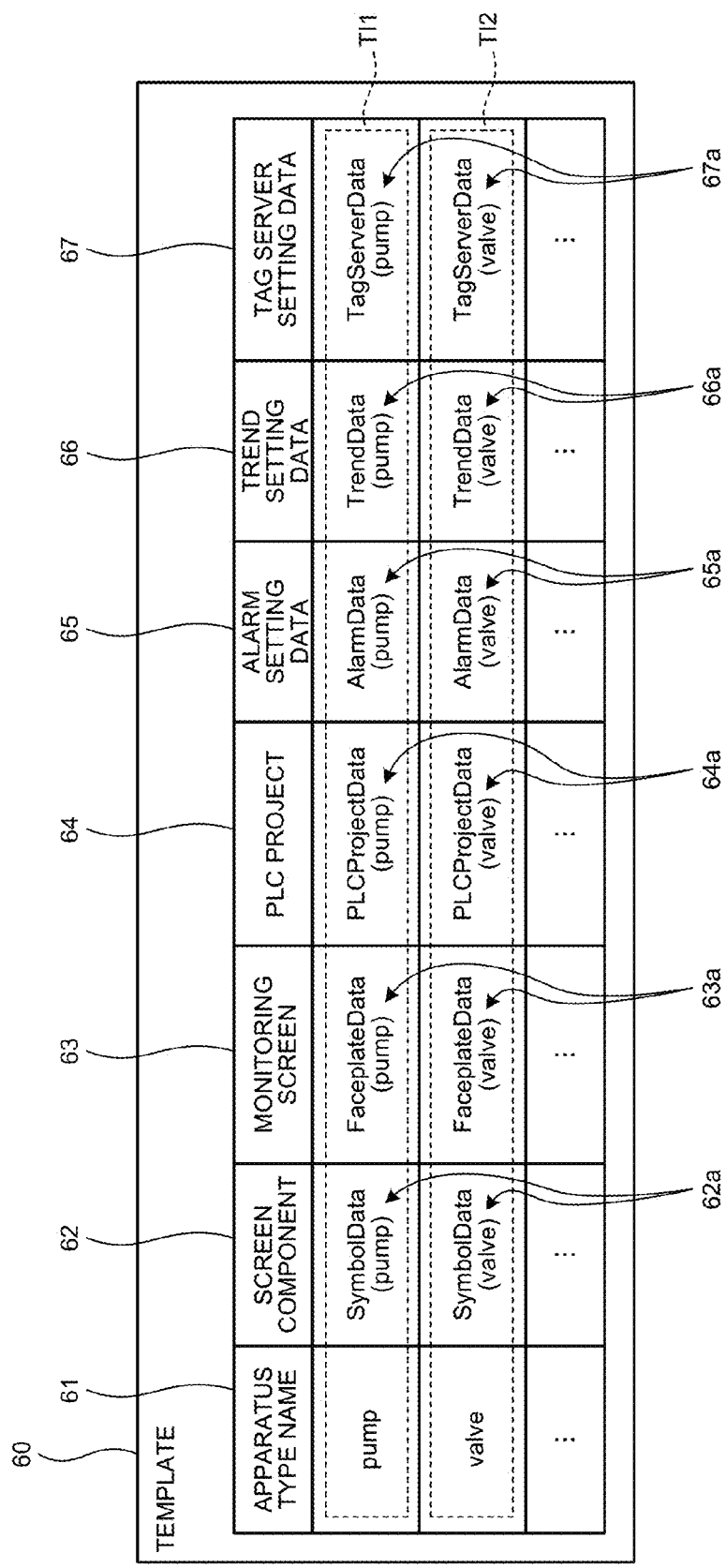
FIG. 9 is a diagram of the configuration of a template library in the embodiment.

For example, the template allocating unit 23 specifies an apparatus type "Valve" concerning an apparatus "VLV_001" according to the apparatus list 70 (see FIG. 5) and allocates, to the apparatus "VLV_001", one piece of template information TI2 selected from among the plurality of template information TI1 and TI2 according to the specified apparatus type "Valve" (see FIG. 9).

In this case, for example, the template allocating unit 23 allocates the template information TI2 to the apparatus "VLV_001" to perform, concerning the apparatus "VLV_001", tying by tag names among the monitoring screen setting data 63, the PLC project setting data 64, the alarm setting data 65, the trend setting data 66, and the tag server setting data 67.

The template allocating unit 23 supplies, to the automatic generation unit 24, allocation information including information indicating which of the template information is allocated to each of the apparatuses and the allocated template information.

Figure 6:
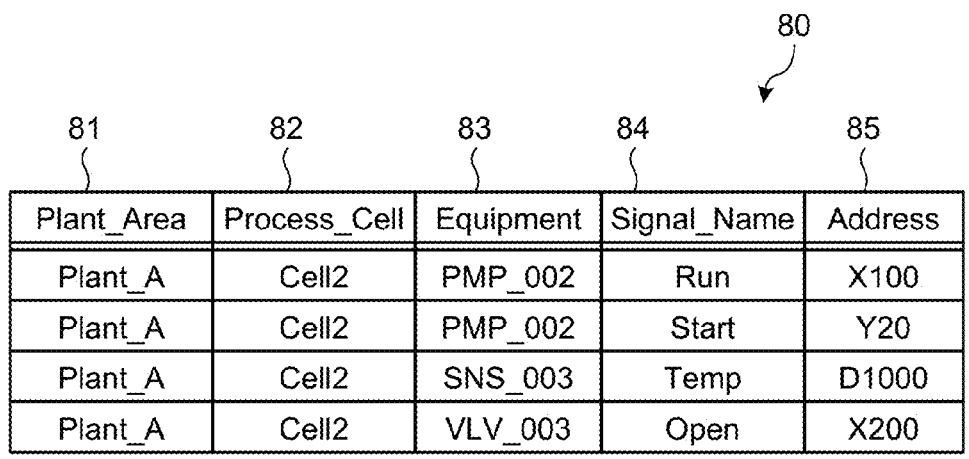
FIG. 6 is a diagram of the configuration of an I/O allocation list in the embodiment.

The template allocating unit 23 automatically generates, concerning each of the apparatuses, according to the apparatus list 70 and the template information allocated to the apparatuses, an I/O allocation list 80' excluding Address information 85 in an I/O allocation list 80 (see FIG. 4 and FIG. 6). That is, the template allocating unit 23 does not receive an interactive request from the user and automatically generates, concerning each of the apparatuses, the I/O allocation list 80' according to the apparatus list 70 and the template information allocated to the apparatuses. The template allocating unit 23 supplies the automatically generated I/O allocation list 80' to the output unit 27.

The output unit 27 receives the I/O allocation list 80' from the template allocating unit 23. The output unit 27 outputs (exports) the I/O allocation list 80' to the outside of the system construction support tool 20. For example, the output unit 27 outputs the I/O allocation list 80' to the display device 12 and the storage device 14. According to the output of the I/O allocation list 80', the Address information 85 (see FIG. 6) is added to the I/O allocation list 80' by the user. The I/O allocation list 80' is updated to the I/O allocation list (see FIG. 4 and FIG. 6) 80. The updated I/O allocation list (see FIG. 4 and FIG. 6) 80 is input to the input unit 26. In the I/O allocation list 80, concerning the apparatuses that should be monitored and controlled by the monitoring and control system S, input and output operation of apparatuses are specified. In the I/O allocation list 80, for example, concerning the apparatuses that should be monitored and controlled by the monitoring and control system S, identifiers (e.g., Equipment information 83 shown in FIG. 6) of the apparatuses are associated with information (e.g., Signal_Name information 84 and the Address information 85) indicating the input and output operations of the apparatuses. For example, the input unit 26 supplies the input apparatus list 70 and the I/O allocation list 80 to the automatic generation unit 24.

The automatic generation unit 24 receives the apparatus list 70 and the I/O allocation list 80 from the input unit 26 and receives allocation information from the template allocating unit 23. The allocation information is information indicating which template information is allocated to the apparatuses. The automatic generation unit 24 automatically generates, according to the apparatus list 70, the I/O allocation list 80, and the allocation information, various kinds of information necessary in constructing the monitoring and control system S. That is, the automatic generation unit 24 does not receive an interactive request from the user and automatically generates, according to the apparatus list 70, the I/O allocation list 80, and the allocation information, various kinds of information necessary in constructing the monitoring and control system S.

For example, the automatic generation unit 24 generates definition information of a monitoring screen 110 (see FIG. 4) according to the apparatus list 70, the I/O allocation list 80, and the allocation information. That is, the automatic generation unit 24 specifies, according to the apparatus list 70, the I/O allocation list 80, and the allocation information, the monitoring screen setting data 63 and a screen component (a symbol) 62 included in the template information allocated to the apparatuses (see FIG. 9) and generates the definition information of the monitoring screen 110 using the specified monitoring screen setting data 63 and the screen component (the symbol) 62. The definition information of the monitoring screen 110 includes, for example, definition information of an overview screen 111 and a face plate screen 112. The overview screen 111 is a monitoring screen on which screen components (symbols) representing apparatuses are arranged in a general view that simulates a process of a plant (see FIG. 4). The face plate screen 112 is a monitoring screen popup-displayed when a screen component (a symbol) on the overview screen 111 is, for example, double-clicked (see FIG. 4). The automatic generation unit 24 performs such generation of the definition information of the monitoring screen 110 concerning each of the apparatuses monitored and controlled by the monitoring and control system S. For example, the automatic generation unit 24 can generate the definition information of the monitoring screen 110 concerning all the apparatuses monitored and controlled by the monitoring and control system S or can classify all the apparatuses monitored and controlled by the monitoring and control system S into several groups and generate the definition information of the monitoring screen 110 for each of the groups. The automatic generation unit 24 outputs the generated definition information of the monitoring screen 110 to the automatically-generated-data output unit 25.

Alternatively, for example, the automatic generation unit 24 generates, according to the apparatus list 70, the I/O allocation list 80, and the allocation information, setting information of alarm operations associated with identifiers of the apparatuses. That is, the automatic generation unit 24 specifies, according to the apparatus list 70, the I/O allocation list 80, and the allocation list, the alarm setting data 65 included in the template information allocated to the apparatuses (see FIG. 9) and generates, according to the specified alarm setting data 65, setting information of alarm operations associated with the identifiers of the apparatuses. The automatic generation unit 24 performs such generation of the setting information of the alarm operations concerning each of the apparatuses monitored and controlled by the monitoring and control system S. The automatic generation unit 24 outputs the generated setting information of the alarm operations to the automatically-generated-data output unit 25 in a form in which the setting information is associated with the identifiers of the apparatuses.

Alternatively, for example, the automatic generation unit 24 generates, according to the apparatus list 70, the I/O allocation list 80, and the allocation information, setting information of trend operations associated with the identifiers of the apparatuses. That is, the automatic generation unit 24 specifies, according to the apparatus list 70, the I/O allocation list 80, and the allocation information, the trend setting data 66 included in the template information allocated to the apparatuses (see FIG. 9) and generates, according to the specified trend setting data 66, the setting information of the trend operations associated with the identifiers of the apparatuses. The automatic generation unit 24 performs such generation of the setting information of the trend operations concerning each of the apparatuses monitored and controlled by the monitoring and control system S. The automatic generation unit 24 outputs the generated setting information of the trend operations to the automatically-generated-data output unit 25 in a form in which the setting information is associated with the identifiers of the apparatuses.

Alternatively, for example, the automatic generation unit 24 generates, according to the apparatus list 70, the I/O allocation list 80, and the allocation information, tags associated with the identifiers of the apparatuses. That is, the automatic generation unit 24 specifies, according to the apparatus list 70, the I/O allocation list 80, and the allocation information, the tag server setting data 67 included in the template information allocated to the apparatuses (see FIG. 9) and generates, according to the specified tag server setting data 67, the tags associated with the identifiers of the apparatuses. The tags are tags for designating tag nodes used for communication in the tag server 34 to perform communication via the tag server 34. The automatic generation unit 24 performs such generation of the tags concerning each of the apparatuses monitored and controlled by the monitoring and control system S. The automatic generation unit 24 outputs the generated tags to the automatically-generated-data output unit 25 in a form in which the tags are associated with the identifiers of the apparatuses.

Alternatively, for example, the automatic generation unit 24 generates a PLC project according to the apparatus list 70, the I/O allocation list 80, and the allocation information. That is, the automatic generation unit 24 specifies, according to the apparatus list 70, the I/O allocation list 80, and the allocation information, the PLC project setting data 64 included in the template information allocated to the apparatuses (see FIG. 9) and generates the PLC project according to the specified PLC project setting data 64. The PLC project includes a control program that should be written in the PLC 35 so as to be executed in the PLC 35. The control program is, for example, a program (e.g., a ladder program) for causing the apparatuses to individually operate or combining several apparatuses and causing the apparatuses to perform a desired system operation (interlock, group start and stop, automatic operation, etc.). The control program includes label data for specifying apparatuses to be combined, a function block for specifying predetermined functional processing, and a PLC program for realizing control processing using the label data and the function blocks. The automatic generation unit 24 performs such generation of the PLC project concerning each of the apparatuses monitored and controlled by the monitoring and control system S. For example, the automatic generation unit 24 can generates the PLC project concerning all the apparatuses monitored and controlled by the monitoring and control system S, can classify the all the apparatuses monitored and controlled by the monitoring and control system S into several groups and generate the PLC project for each of the groups, or can generate the PLC project for each apparatus in the apparatuses monitored and controlled by the monitoring and control system S. The automatic generation unit 24 outputs the generated PLC project to the automatically-generated-data output unit 25.

The automatically-generated-data output unit 25 receives the generated various kinds of information from the automatic generation unit 24 and outputs the thus generated various kinds of information. Among the various kinds of information generated by the automatic generation unit 24, there are information for which registration processing is necessary and information for which the registration process ing is unnecessary. Therefore, the automatically-generated-data output unit 25 includes a registering unit 25a and an output unit 25b. For example, the automatically-generated-data output unit 25 determines that, among the generated various kinds of information, information associated with the identifiers of the apparatuses is the information for which the registration processing is necessary and supplies the information to the registering unit 25a. The automatically-generated-data output unit 25 determines that information not associated with the identifiers of the apparatuses is the information for which the registration processing is unnecessary and supplies the information to the output unit 25b.

For example, the registering unit 25a receives various kinds of information associated with the identifiers of the apparatuses. The registering unit 25a registers the received information in association with the identifiers of the apparatuses.

For example, when receiving the generated setting information of the alarm operations in the form in which the setting information is associated with the identifiers of the apparatuses, the registering unit 25a accesses the application server 32. The registering unit 25a registers the setting information of the alarm operations in the application server 32 in association with the identifiers of the apparatuses.

Alternatively, for example, when receiving the generated setting information of the trend operations in the form in which the setting information is associated with the identifiers of the apparatuses, the registering unit 25a accesses the application server 32. The registering unit 25a registers the setting information of the trend operations in the application server 32 in association with the identifiers of the apparatuses.

Alternatively, for example, when receiving the generated tags in a form in which the tags are associated with the identifiers of the apparatuses, the registering unit 25a accesses the tag server 34. The registering unit 25a registers the tags in the tag server 34 in association with the identifiers of the apparatuses.

For example, the output unit 25b receives various kinds of information not associated with the identifiers of the apparatuses. The output unit 25b directly outputs the received information.

For example, the output unit 25b receives the generated definition information of the monitoring screen 110 and outputs the definition information of the monitoring screen 110 to the display device 12 and the storage device 14 of the information processing apparatus 10. Consequently, the display device 12 displays the overview screen 111 and the face plate screen 112 on the display screen 12a according to the definition information of the monitoring screen 110.

Alternatively, for example, the output unit 25b receives the PLC project and outputs the PLC project to the PLC programming tool 33. Consequently, the PLC programming tool 33 programs a control program in the PLC 35 according to the PLC project.

Note that, as shown in FIG. 4, a system including an upstream design tool 91, an extracting unit 92, and the system construction support tool 20 can be grasped as one system 90. The upstream design tool 91 is a tool for performing upstream design and generates a piping and instrumentation diagram (P&ID) for a monitoring target according to an interactive request or the like from the user. The upstream design tool 91 supplies information concerning the generated piping and instrumentation diagram to the extracting unit 92. The extracting unit 92 extracts information concerning the apparatuses from the piping and instrumentation diagram and supplies the extracted information to the system construction support tool 20 as the apparatus list 70.

Figure 5:
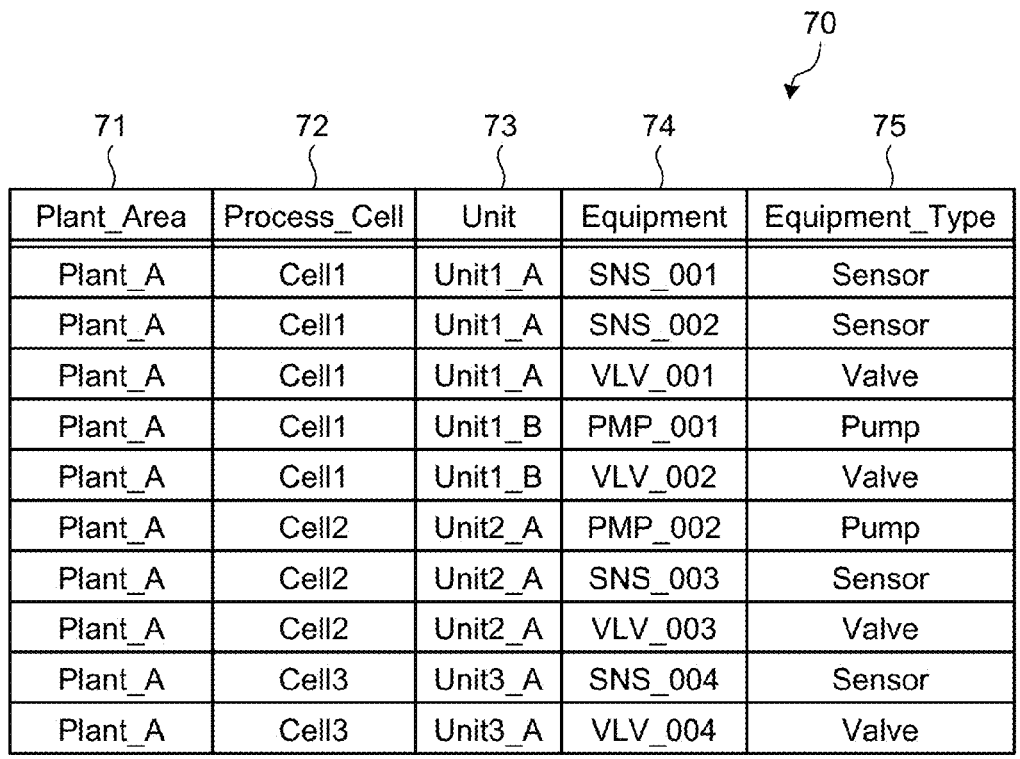
FIG. 5 is a diagram of the configuration of an apparatus list in the embodiment.

The configuration of the apparatus list 70 is explained with reference to FIG. 5. FIG. 5 is a diagram showing the configuration of the apparatus list 70.

In the apparatus list 70, concerning the apparatuses that should be monitored and controlled by the monitoring and control system S, attributes of apparatuses including apparatus types are specified. In the apparatus list 70, for example, concerning the apparatuses that should be monitored and controlled by the monitoring and control system S, the identifiers (e.g., the Equipment information 74 shown in FIG. 5) are associated with the information (e.g., the Equipment_type information 75 shown in FIG. 5) indicating the attributes of the apparatuses. For example, as shown in FIG. 5, the apparatus list 70 includes, concerning the apparatuses, Plant_Area information 71, Process_Cell information 72, Unit information 73, the Equipment information 74, and the Equipment_type information 75. The Plant_Area information 71 indicates a plant or a set of factory units where the apparatuses should be arranged. The Process_Cell information 72 indicates a set of PLC units to which the apparatuses should be connected. The Unit information 73 indicates a set of units such as facilities or lines to which the apparatuses should belong. The Equipment information 74 indicates the identifiers of the apparatuses. The Equipment_type information 75 indicates the apparatus types.

For example, by referring to the apparatus list 70, it is made possible to grasp an apparatus type of apparatuses "VLV_001", "VLV_002", "VLV_003", and "VLV_004" is "Valve". Alternatively, for example, by referring to the apparatus list 70, it is made possible to grasp that an apparatus type of apparatuses "PMP_001", "PMP_002", "PMP_003", and "PMP_004" is "Pump". Alternatively, for example, by referring to the apparatus list 70, it is possible to grasp that an apparatus type of apparatuses "SNS_001", "SNS_002", "SNS_003", and "SNS_004" is "Sensor".

Note that, in FIG. 4, as an example, the apparatus list 70 is a CSV format. However, a format of the apparatus list 70 is not limited to the CSV format as long as the apparatus list 70 substantially has a data structure of a table format. For example, a delimiter can be a space, a tab, a predetermined sign, or the like instead of a comma. Alternatively, for example, the apparatus list 70 can be binary data, which is complied to be data of a table format, instead of text data.

The configuration of the I/O allocation list 80 is explained with reference to FIG. 6. FIG. 6 is a diagram showing the configuration of the I/O allocation list 80.

In the I/O allocation list 80, concerning the apparatuses that should be monitored and controlled by the monitoring and control system S, input and output operations of apparatuses are specified. In the I/O allocation list 80, for example, concerning the apparatuses that should be monitored and controlled by the monitoring and control system S, the identifiers (e.g., the Equipment information 83 shown in FIG. 6) of the apparatuses are associated with information (e.g., the Signal_Name information 84 and the Address information 85) indicating the input and output operations of the apparatuses.

For example, as shown in FIG. 6, the I/O allocation list 80 includes, concerning the apparatuses, the Plant_Area information 81, the Process_Cell information 82, the Equipment information 83, the Signal_Name information 84, and the Address information 85. The Plant_Area information 81 indicates a plant or a set of factory units where the apparatuses should be arranged. The Process_Cell information 82 indicates a set of PLC units to which the apparatuses should be connected. The Equipment information 83 indicates the identifiers of the apparatuses. The Signal_Name information 84 indicates names of signals input to or output from the apparatuses. The Address information 85 indicates an address of a device in the PLC 35 used for inputting to or outputting from the apparatuses.

For example, by referring to the I/O allocation list 80, it is possible to grasp that a signal "Run" is input to the apparatus "PMP_002" from an address "X100" in the PLC 35, a signal "Start" is input to the apparatus "PMP_002" from an address "Y20" in the PLC 35, a signal "Temp" is output from the apparatus "SNS_003" to an address "D1000" in the PLC 35, and a signal "Open" is input to the apparatus "VLV_003" from an address "X200" in the PLC 35.

Note that, in FIG. 6, as an example, the I/O allocation list 80 is a CVS format. However, a format of the I/O allocation list 80 is not limited to the CVS format as long as the I/O allocation list 80 substantially has a data structure of a table format. For example, a delimiter can be a space, a tab, a predetermined sign, or the like instead of a comma. Alternatively, for example, the I/O allocation list 80 is binary data, which is compiled to be data of a table format, instead of text data.

Figure 8:
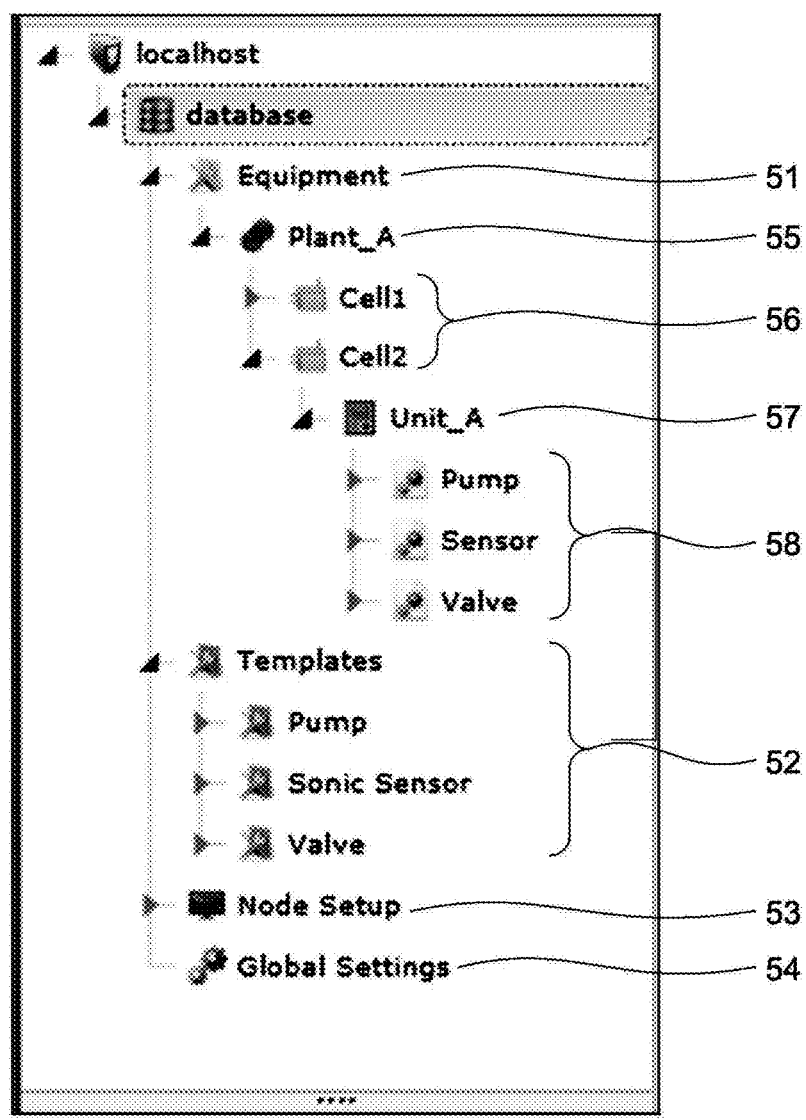
FIG. 8 is a diagram of the configuration of a tree display section of the system design support tool screen in the embodiment.

The configuration of the system construction support tool screen 40 displayed on the display device 12 by the system construction support tool 20 is explained with reference to FIG. 7 and FIG. 8. FIG. 7 is a diagram of the configuration of the system construction support tool screen 40. FIG. 8 is a configuration diagram of a tree displayed on the tree display section 41 in the system construction support tool screen 40.

The system construction support tool screen 40 includes, as shown in FIG. 7, a tree display section 41, an item-list display section 42, an item-setting display section 43, and a tool-list display section 44.

In the tree display section 41, information concerning the apparatuses monitored and controlled by the monitoring and control system S can be hierarchically displayed and a plurality of template information can be displayed. For example, when an item "Equipment" is clicked in the tree display section 41, a Plant_Area "Plant_A" is displayed. When the Plant_Area "Plant_A" is clicked, Process Cells "Cell2" and "Cell2" are displayed. When the Process_Cell "Cell2" is clicked, a Unit "Unit_A" is displayed.

In the item-list display section 42, a list of (e.g., all) items configured by targets currently selected in the tree display section 41 is displayed.

In the item-setting display section 43, a screen for performing detailed setting of specific items selected in the tree display section 41 and the item-list display section 42 is displayed.

In the tree display section 41, for example, as shown in FIG. 8, Equipment information 51, Templates information 52, Node Setup information 53, and Global Settings information 54 are displayed. The Equipment information 51 is information for showing a list of apparatuses. The Templates information 52 is information for showing a list of registered template information. The Node Setup information 53 is information for showing setting information of a tag server and an application server. The Global Settings information 54 is information for setting a generated data output destination of monitoring screen data, PLC project data, and setting data for the tag server. In the Equipment information 51, for example, a list of Plant Area information 55 indicating a plant or a set of factory units, Process Cell information 56 indicating a set of PLC units, Unit information 57 indicating a set of units such as facilities or lines, and apparatus information 58 indicating registered apparatuses can be displayed in a tree format. Note that, in the tree display section 41, addition and correction of a tree and setting and a change of various setting items can be performed.

In the information processing apparatus 10, besides the system construction support tool 20, other tools can also be used on the same application platform. In the tool list display section 44, a plurality of tools including the system construction support tool 20 are displayed. When a tool among a plurality of tools is selected in the tool-list display section 44, the selected tool becomes active. For example, in the information processing apparatus 10, a display operation by the display device (the display unit) 12 is performed as explained below.

For example, when a SCADA screen editing tool is selected in the tool-list display section 44, the SCADA screen editing tool becomes active. When the SCADA screen editing tool becomes active, the item-list display section 42 and the item-setting display section 43 are united into one so as to be an editing display section 45. In the SCADA screen editing tool, it is possible to perform creation and editing of the monitoring screen 110 (e.g., the overview screen 111 and the face plate 112) and symbol components (screen components and symbols) on the editing display section 45. Editing of layouts and display colors, setting of tags, and the like can be performed for the overview screen 111, the face plate screen 112, and the symbol components. The face plate screen 112, which should be popped up, can be set for the symbol components. The symbol components can be arranged on the overview screen 111. On the overview screen 111, it is possible to display monitoring data by arranging monitoring data display components (symbol components) on the screen or it is possible to perform display of the monitoring data, input of setting values, control by button pressing, and the like by arranging a monitoring data display section, a setting-value input section, and buttons on the face plate screen 112 for the symbol components.

According to the generation of the monitoring screen 110, if it is desired to display, on the overview screen 111 as well, monitoring information (e.g., the water level, the water amount, the pressure, and the like of a tank) displayed on the generated face plate screen 112, when a check box arranged near the monitoring-data display section for monitoring information is checked, selected information is displayed in the vicinity of a symbol on the overview screen 111 where the target face plate screen 112 is set. All kinds of monitoring information displayed on the face plate screen 112 are set to be capable of being displayed in the vicinity of the symbol on the overview screen 111. Unless the check box on the face plate screen 112 is checked, the monitoring information is in a hidden state. A display position of the monitoring information can be changed by the user using the SCADA screen editing tool.

For example, when the alarm editing tool is selected in the tool-list display section 44, the alarm editing tool becomes active. The item-list display section 42 and the item-setting display section 43 are united into one to be the editing display section 45. With the alarm editing tool, it is possible to access the application server 32 and perform setting of an alarm and creation and editing of an alarm display screen.

For example, when the trend editing tool is selected in the tool-list display section 44, the trend editing tool becomes active. The item-list display section 42 and the item-setting display section 43 are united into one so as to be the editing display section 45. With the trend editing tool, it is possible to access the application server 32 and perform setting of a trend and creation and editing of a trend display screen.

When there are pluralities of the overview screens, the alarm display screens, and the trend display screens created by the tools, it is possible to switch the screens to screens desired to be displayed using a screen switching button.

The configuration of the template library 60 used by the system construction support tool 20 when the system construction support tool 20 constructs the monitoring and control system S is explained with reference to FIG. 9. FIG. 9 is a diagram of the configuration of the template library 60.

The template library 60 is stored in, for example, the non-volatile storage device 14a in a table format shown in FIG. 9 by, for example, the template storing unit 22. The plurality of template information TI1 and TI2 are read out from the template library 60 and stored in the template storing unit 22 by, for example, the template storing unit 22.

In the template library 60, a plurality of setting data are associated for each apparatus type name 61. The setting data include the screen component (the symbol) 62, the monitoring screen setting data 63, the PLC project setting data 64, the alarm setting data 65, the trend setting data 66, and the tag server setting data 67.

The monitoring screen setting data 63 corresponds to a screen component (a symbol). The PLC project setting data 64 includes, for example, label data, a PLC program, and a function block. The alarm setting data 65 is, for example, data for setting alarm data to be stored in the application server 32. The trend setting data 66 is, for example, data for setting trend data to be stored in the application server 32. The tag server setting data 67 includes, for example, data for setting a tag server and data of tags.

The template library 60 includes the template information TI1 and TI2, for example, for each of rows. In the template information TI1 and TI2, a plurality of setting data are tied to one another by the tag names 62a to 67a in advance. That is, the setting data 62 to 67 are associated with one another by the tag names 62a to 67a in advance such that, when a state of one setting data in the setting data 62 to 67 changes, states of the other setting data in the setting data 62 to 67 also change in association with the change.

For example, concerning the template information TI1 in which the apparatus type name 61 is "pump", a plurality of setting data are tied to one another, for example, as explained below. A Start button corresponding to a screen component 62 is arranged on the face plate screen 112 corresponding to the monitoring screen setting data 63. When the Start button is pressed by the user, a Start command is transmitted to the PLC 35 via a tag node in the tag server 34 corresponding to the tag server setting data 67. A control program corresponding to the PLC project setting data 64 outputs a Start operation command from the PLC 35 to the apparatus 36-2 and returns status information during operation to the information processing terminal 10 via the tag node in the tag server 34 corresponding to the tag server setting data 67. The status information during operation returned to the information processing terminal 10 is displayed on the face plate screen 112 and changes an alarm operation corresponding to the alarm setting data 65 to an active state and changes a trend operation corresponding to the trend setting data 66 to the active state.

Alternatively, for example, concerning the template information TI2 in which the apparatus type name 61 is "valve", a plurality of setting data are tied to one another, for example, as explained below. An Open button corresponding to the screen component 62 is arranged on the face plate screen 112 corresponding to the monitoring screen setting data 63. When the Open button is pressed by the user, an Open command is transmitted to the PLC 35 via the tag node in the tag server 34 corresponding to the tag server setting data 67. The control program corresponding to the PLC project setting data 64 outputs an Open operation command from the PLC 35 to the apparatus 36-3 and returns status information during the operation to the information processing terminal 10 via the tag node in the tag server 34 corresponding to the tag server setting data 67. The status information during the operation returned to the information processing terminal 10 is displayed on the face plate screen 112 and changes the alarm operation corresponding to the alarm setting data 65 to the active state and changes the trend operation corresponding to the trend setting data 66 to the active state.

Alternatively, for example, concerning template information (not shown in the figure) in which the apparatus type name 61 is "sensor", a plurality of setting data are tied to one another, for example, as explained below. A measurement button corresponding to the screen component 62 is arranged on the face plate screen 112 corresponding to the monitoring screen setting data 63. When the measurement button is pressed by the user, a measurement command is transmitted to the PLC 35 via the tag node in the tag server 34 corresponding to the tag server setting data 67. The control program corresponding to the PLC project setting data 64 returns a measurement value input to the PLC 35 from the apparatus 36-1 to the information processing terminal 10 via the tag node in the tag server 34 corresponding to the tag server setting data 67. The measurement value returned to the information processing terminal 10 is displayed on the face plate screen 112. If the measurement value (e.g., temperature) exceeds a threshold, an alarm is generated by the alarm operation corresponding to the alarm setting data 65. Trend data is updated by the trend operation corresponding to the trend setting data 66 using the measurement value.

Note that a format of the template library 60 is not limited to a specific format as long as the template library 60 has a data structure of a substantially table format. For example, a delimiter can be a space, a tab, a predetermined sign, or the like instead of a comma. Alternatively, for example, the apparatus list 70 can be binary data, which is compiled to be data of a table format, instead of the text data.

Figure 10:
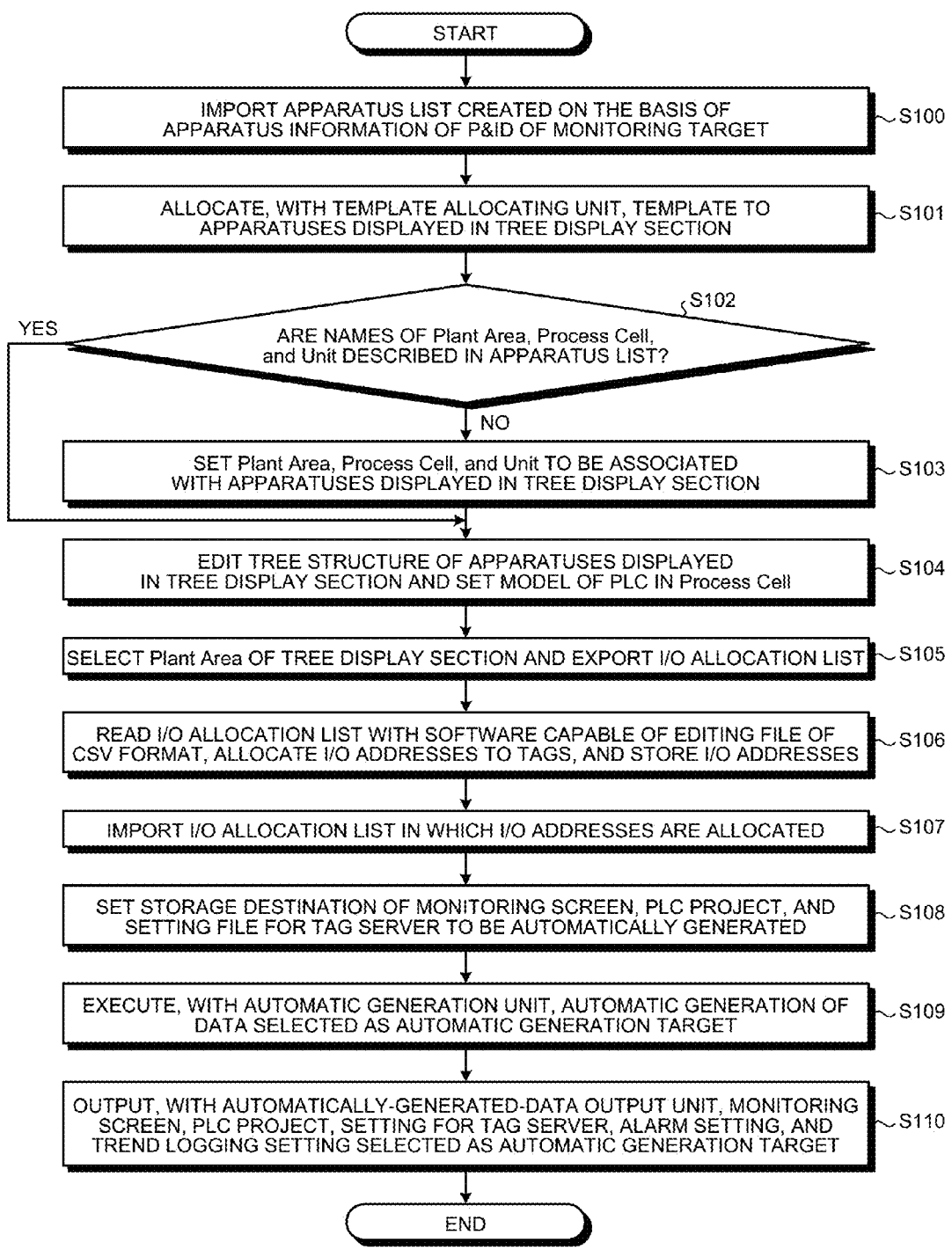
FIG. 10 is a flowchart for explaining the operation of the system design support tool according to the embodiment.

The operation of the system construction support tool 20 is explained using FIG. 10. FIG. 10 is a flowchart for explaining the operation of the system construction support tool 20.

The upstream design tool 91 generates a piping and instrumentation diagram (P&ID) for, for example, a monitoring target (e.g., a factory), which is an asset of the user, and supplies the piping and instrumentation diagram to the extracting unit 92. The extracting unit 92 extracts, from the piping and instrumentation diagram, information concerning apparatuses determined by upstream design. As the extracting unit 92, for example, an export function of a general-purpose (a general-purpose CAD, etc.) can be used. The extracting unit 92 imports the extracted information to the system construction support tool 20 as the apparatus list 70 (step S100).

The template allocating unit 23 allocates, to each of the apparatuses displayed on the tree display section 41, that is, the apparatuses included in the apparatus list 70 imported at step S100, one piece of template information selected from among the plurality of template information registered in the system construction support tool 20 (step S101).

The system construction support tool 20 determines whether the names of the Plant Area information 55, the Process Cell information 56, and the Unit information 57 are described in the apparatus list 70 imported at step S100 (step S102).

When the names of the Plant Area information 55, the Process Cell information 56, and the Unit information 57 are not described in the apparatus list 70 imported at step S100 (No at step S102), the system construction support tool 20 sets, for example, according to an instruction from the user, the names of the Plant Area information 55, the Process Cell information 56, and the Unit information 57 to be associated with the apparatuses displayed on the tree display section 41 (steps S103).

Note that, when the names of the Plant Area information 55, the Process Cell information 56, and the Unit information 57 are not described in the apparatus list 70 imported at step S100 (No at step S102), the system construction support tool 20 can display a predetermined message on the display screen 12a or highlight fields of the Plant Area information 55, the Process Cell information 56, and the Unit information 57 so as to urge inputs of names to the Plant Area information 55, the Process Cell information 56, and the Unit information 57 associated with the apparatuses displayed on the tree display section 41.

When the names of the Plant Area information 55, the Process Cell information 56, and the Unit information 57 are described in the apparatus list 70 imported at step S100 (Yes at step S102), the system construction support tool 20 advances the processing to step S104.

The system construction support tool 20 edits, according to, for example, an instruction from the user, a tree structure (the Plant Area information 55, the Process Cell information 56, and the Unit information 57) of the apparatuses displayed on the tree display section 41 and sets a model of the PLC in the Process Cell information 56 (step S104).

The system construction support tool 20 selects the Plant Area information 55 of the tree display section 41 according to for example, an export instruction from the user and exports the I/O allocation list (the CSV format) 80' (step S105).

Software capable of editing a file of the CSV format reads the I/O allocation list 80' according to, for example, an instruction from the user, allocates I/O addresses to the tags, and stores the I/O addresses (step S106).

The system construction support tool 20 imports the I/O allocation list 80, in which I/O addresses are allocated, to the system construction support tool 20 according to, for example, an import instruction from the user (step S107).

The system construction support tool 20 selects the Global Settings information 54 in the tree display section 41 according to, for example, the import instruction from the user and sets, in the item-setting display section 43, a storage destination of a monitoring screen, a PLC project, and a setting file for the tag server to be generated (step S108).

The automatic generation unit 24 checks an automatic generation target on an automatic generation target selection screen and executes automatic generation (step S109).

The automatically-generated-data output unit 25 outputs, on the basis of the information set in the apparatuses displayed in the tree display section 41, a monitoring screen, a PLC project, setting information for the tag server, alarm setting information, and trend setting information selected as automatic generation targets (step S110).

The PLC project generated at step S110 is written and set in a target PLC by a PLC programming tool. The setting file for the tag server generated at step S110 is read into the tag server and communication setting for the tag server and setting of tags are performed. The monitoring screen generated at step S110 is edited using a screen editing tool. A symbol (a screen component) arranged in a default position on the upper left of the screen by the generation of the monitoring screen is rearranged in a correct position to complete the screen.

As explained above, in the embodiment, in the system construction support tool 20, the template storing unit 22 stores a plurality of template information. In each of the plurality of template information, an apparatus type name and a plurality of setting data are associated. The apparatus list 70 determined by upstream design such as P&ID for a monitoring target (e.g., a factory) is input to the input unit 26. In the apparatus list 70, attributes of apparatuses including apparatus types are specified concerning a plurality of apparatuses. The template allocating unit 23 specifies an apparatus type concerning each of the apparatuses according to the input apparatus list 70 and allocates, according to the specified apparatus type, one piece of template information selected from among the plurality of template information to each of the apparatuses. In this case, in each of the plurality of template information, a plurality of setting data are tied to one another by tag names in advance. The setting data include the monitoring screen setting data 63, the PLC project setting data 64, and the tag server setting data 67 (see FIG. 9). The template allocating unit 23 allocates one piece of template information selected from among the plurality of template information to each of the apparatuses to perform, concerning each of the apparatuses, tying by tag names among monitoring screen setting data, PLC project setting data, and tag server setting data. That is, by allocating one piece of template information selected from among the plurality of template information to each of the apparatuses, concerning each of the apparatuses, the tying by the tag names among the monitoring screen setting data, the PLC project setting data and the tag server setting data is performed. Therefore, it is made unnecessary to perform a large number of repeated setting works concerning the tying by the tag names among the setting data. As a result, it is possible to reduce the number of processes for the construction of the monitoring and control system. Therefore, it is made possible to reduce labor and time of the user in the construction of the monitoring and control system. It is possible to reduce deficiencies due to inconsistency among the setting data compared with when the tying by the tag names among the setting data is interactively performed.

In the embodiment, in the system construction support tool 20, the setting data further include the screen component 62 in addition to the monitoring screen setting data 63, the PLC project setting data 64, and the tag server setting data (see FIG. 9). The template allocating unit 23 allocates one piece of template information selected from among the plurality of template information to each of the apparatuses to perform, concerning each of the apparatuses, tying by tag names among the monitoring screen setting data, the PLC project setting data, the tag server setting data, and the screen component. That is, by allocating one piece of template information selected from among the plurality of template information to each of the apparatuses, the tying by the tag names among the monitoring screen setting data, the PLC project setting data, the tag server setting data, and the screen component is performed concerning each of the apparatuses. Therefore, it is made unnecessary to perform a large number of repeated setting works concerning tying by tag names among a larger number of setting data. It is made possible to further reduce the number of processes for the construction of the monitoring and control system.

In this embodiment, in the system construction support tool 20, the automatic generation unit 24 generates, concerning each of the apparatuses, definition information of the monitoring screen using the setting data and the screen component of the monitoring screen included in the allocated template information. Consequently, it is made possible to generate set screens in each component even if the screens are not created from the beginning. That is, it is made unnecessary to perform a large number of repeated setting works concerning the generation of the definition information of the monitoring screen. It is possible to further reduce the number of processes for the construction of the monitoring and control system.

In the embodiment, in the system construction support tool 20, the plurality of setting data further include the alarm setting data 65 in addition to the monitoring screen setting data 63, the PLC project setting data 64, and the tag server setting data (see FIG. 9). The template allocating unit 23 allocates one piece of template information selected from among the plurality of template information to each of the apparatuses to perform, concerning each of the apparatuses, tying by tag names among the monitoring screen setting data, the PLC project setting data, the tag server setting data, and the alarm setting data. That is, by allocating one piece of template information selected from among the plurality of template information to each of the apparatuses, the tying by the tag names among the monitoring screen setting data, the PLC project setting data, the tag server setting data, and the alarm setting data is performed concerning each of the apparatuses. Therefore, it is made unnecessary to perform a large number of repeated setting works concerning the tying by the tag names among a larger number of setting data, and thus it is made possible to further reduce the number of processes for the construction of the monitoring and control system.

In this embodiment, in the system construction support tool 20, the registering unit 25a registers, concerning each of the apparatuses, setting information of alarm operations in association with the identifiers of the apparatuses according to the alarm setting data included in the allocated template information. Consequently, it is made unnecessary to perform a large number of repeated setting works concerning the registration of the setting information of the alarm operations, and thus it is made possible to further reduce the number of processes for the construction of the monitoring and control system.

In the embodiment, in the system construction support tool 20, the plurality of setting data further include the trend setting data 66 in addition to the monitoring screen setting data 63, the PLC project setting data 64, and the tag server setting data (see FIG. 9). The template allocating unit 23 allocates one piece of template information selected from among the plurality of template information to each of the apparatuses to perform, concerning each of the apparatuses, tying by tag names among the monitoring screen setting data, the PLC project setting data, the tag server setting data, and the trend setting data. That is, by allocating one piece of template information selected from among the plurality of template information to each of the apparatuses, the tying by the tag names among the monitoring screen setting data, the PLC project setting data, the tag server setting data, and the trend setting data is performed concerning each of the apparatuses. Therefore, it is made unnecessary to perform a large number of repeated setting works concerning the tying by the tag names among a larger number of setting data, and thus it is made possible to further reduce the number of processes for the construction of the monitoring and control system.

In this embodiment, in the system construction support tool 20, the registering unit 25a registers, concerning each of the apparatuses, setting information of the trend operations in association with the identifiers of the apparatuses according to the trend setting data included in the allocated template information. Consequently, it is made unnecessary to perform a large number of repeated setting works concerning the registration of the setting information of the alarm operations, and thus it is made possible to further reduce the number of processes for the construction of the monitoring and control system.

In this embodiment, in the system construction support tool 20, the registering unit 25a registers, concerning each of the apparatuses, tags in association with the identifiers of the apparatuses according to the tag server setting data included in the allocated template information. Consequently, it is made possible to collectively perform the setting of the tags without manually setting the tags one by one. That is, it is made unnecessary to perform a large number of repeated setting works concerning the registration of the tags, and thus it is made possible to further reduce the number of processes for the construction of the monitoring and control system.

In the embodiment, in the system construction support tool 20, the automatic generation unit 24 generates, concerning each of the apparatuses, according to the PLC project setting data included in the allocated template information, a PLC project in which label data, a PLC program, and a function program are used. Consequently, even if a program is not created from the beginning, it is made possible to combine the function blocks included as the template library to generate a program corresponding to the components of the monitoring screen definition information. That is, it is made unnecessary to perform a large number of repeated setting works concerning the registration of the PLC project, and thus it is made possible to further reduce the number of processes for the construction of the monitoring and control system.

In the embodiment, each of the plurality of template information includes, as a plurality of setting data, design contents that can be made common for each of the types of the apparatuses. That is, the initial template that covers basic apparatuses is prepared in default, and thus it is also made possible to reduce design man-hours during initial product development.

INDUSTRIAL APPLICABILITY

As explained above, the system construction support tool according to the present invention is useful for the construction of the monitoring and control system.

REFERENCE SIGNS LIST

10 Information processing apparatus
11 Input device
12 Display device
12a Display screen
13 Central processing unit
14 Storage device
15 Acquisition interface
20 System design support tool
21 Apparatus-list display unit
22 Template storing unit
23 Template allocating unit
24 Automatic generation unit
25 Automatically-generated-data output unit
25a Registering unit
25b Output unit
26 Input unit
27 Output unit
32 Application server
33 PLC programming tool
34 Tag server
35 PLC
40 System design support tool screen
41 Tree display section
42 Item-list display section
43 Item-setting display section
44 Tool-list display section
45 Editing display section
51 Equipment
52 Templates
53 Node Setup
54 Global Settings
55 Plant Area
56 Process Cell
57 Unit
58 Apparatus
60 Template library
61 Apparatus type name
62 Screen component (symbol)
63 Monitoring screen setting data
64 PLC project setting data
65 Alarm setting data
66 Trend setting data
67 Tag server setting data
70 Apparatus list
80, 80' I/O allocation lists
110 Monitoring screen
111 Overview screen
112 Face plate screen

The invention claimed is:

1. A system construction support tool that supports construction of a monitoring and control system in which a monitoring apparatus monitors and controls a plurality of apparatuses via a tag server and a PLC (Programmable Logic Controller), the system construction support tool comprising:
an input unit to which an apparatus list in which, concerning the plurality of apparatuses, attributes of apparatuses including apparatus types are specified is input;
a storing unit that stores a plurality of template information in which an apparatus type name and a plurality of setting data are respectively associated; and
an allocating unit that specifies an apparatus type concerning each of the plurality of apparatuses according to the input apparatus list and allocates one piece of template information selected from among the plurality of template information to each of the apparatuses according to the specified apparatus type, wherein
in each of the plurality of template information, the setting data are tied to one another using tag names in advance;
the setting data include monitoring screen setting data, PLC project setting data, and tag server setting data,
the allocating unit allocates one piece of template information selected from among the plurality of template information to each of the apparatuses to perform, concerning each of the apparatuses, tying by tag names among the monitoring screen setting data, the PLC project setting data, and the tag server setting data,
the display unit displays a system construction support tool screen including a tree display section and an item-setting display section,
the apparatus list extracted from a piping and instrumentation diagram of a monitoring target created in upstream design is input to the input unit to enable effective utilization of an asset of a user,
the display unit hierarchically displays a list of the apparatuses in the tree display section in multiple stages and hierarchically displays the plurality of template information in the tree display section according to the input apparatus list,
when there is missing information in the extracted apparatus list, the display unit displays the extracted apparatus list in a display form for urging an input of the missing information, and
the apparatus list, which is completed when the missing information is input according to the display form for urging an input, is input to the input unit.

2. The system construction support tool according to claim 1, wherein
the plurality of setting data further include a screen component,
the allocating unit allocates one piece of template information selected from among the plurality of template information to each of the apparatuses to perform, concerning each of the apparatuses, tying by tag names among the monitoring screen setting data, the PLC project setting data, the tag server setting data, and the screen component, and
the system construction support tool further comprises a generating unit that generates, concerning each of the apparatuses, a monitoring screen using the setting data and the screen component of the monitoring screen included in the allocated template information.

3. The system construction support tool according to claim 1, wherein
the plurality of setting data further include alarm setting data,
the allocating unit allocates one piece of template information selected from among the plurality of template information to each of the apparatuses to perform, concerning each of the apparatuses, tying by tag names among the monitoring screen setting data, the PLC project setting data, the tag server setting data, and the alarm setting data, and
the system construction support tool further comprises a registering unit that registers, concerning each of the apparatuses, setting information of alarm operations in association with identifiers of the apparatuses according to the alarm setting data included in the allocated template information.

4. The system construction support tool according to claim 1, wherein
the plurality of setting data further include trend setting data,
the allocating unit allocates one piece of template information selected from among the plurality of template information to each of the apparatuses to perform, concerning each of the apparatuses, tying by tag names among the monitoring screen setting data, the PLC project setting data, the tag server setting data, and the trend setting data, and
the system construction support tool further comprises a registering unit that registers, concerning each of the apparatuses, setting information of trend operations in association with identifiers of the apparatuses according to the trend setting data included in the allocated template information.

5. The system construction support tool according to claim 1, further comprising a registering unit that registers, concerning each of the apparatuses, tags in association with identifiers of the apparatuses according to the tag server setting data included in the allocated template information.

6. The system construction support tool according to claim 1, further comprising a generating unit that generates, concerning each of the apparatuses, according to the PLC project setting data included in the allocated template information, a PLC project in which label data, a PLC program, and a function block are used.

7. The system construction support tool according to claim 1, wherein each of the plurality of template information includes, as the plurality of setting data, setting contents that can be made common for each of types of the apparatuses.

8. The system construction support tool according to claim 1, wherein, when there is missing information in the extracted apparatus list, the display unit highlights a field of the missing information.

9. The system construction support tool according to claim 1, wherein
the monitoring screen includes an overview screen and a face plate screen, and
the display unit further displays, according to a selection of a monitoring information item desired to be displayed on the overview screen as well among monitoring information displayed on the generated face plate screen, the selected monitoring information item in the vicinity of a symbol of the overview screen.

10. A system comprising:
an upstream design tool that generates the piping and instrumentation diagram of a monitoring target according to a request from a user;
an extracting unit that extracts, as an apparatus list, information concerning apparatuses from the generated piping and instrumentation diagram; and
the system construction support tool according to claim 8 that supports construction of a monitoring and control system using the extracted apparatus list.

11. A system comprising:
an upstream design tool that generates a piping and instrumentation diagram of a monitoring target according to a request from a user;
an extracting unit that extracts, as an apparatus list, information concerning apparatuses from the generated piping and instrumentation diagram; and
the system construction support tool according to claim 9 that supports construction of a monitoring and control system using the extracted apparatus list.

12. The system construction support tool according to claim 8, wherein the display unit displays, in the item-setting display section, a plurality of setting item fields of an apparatus selected in the tree display section and, when there is missing information among the displayed setting items, highlights a setting item field of the missing information.

13. The system construction support tool according to claim 1, wherein, when an icon indicating a file of an apparatus list is dragged and dropped to the tree display section of the system construction support tool screen, the apparatus list is input to the input unit.

* * * * *